J. FREDRIKSSON.
PROCESS FOR PRODUCING HIGHLY CONCENTRATED HYDROCHLORIC ACID.
APPLICATION FILED NOV. 9, 1918.
1,398,224. Patented Nov. 29, 1921.
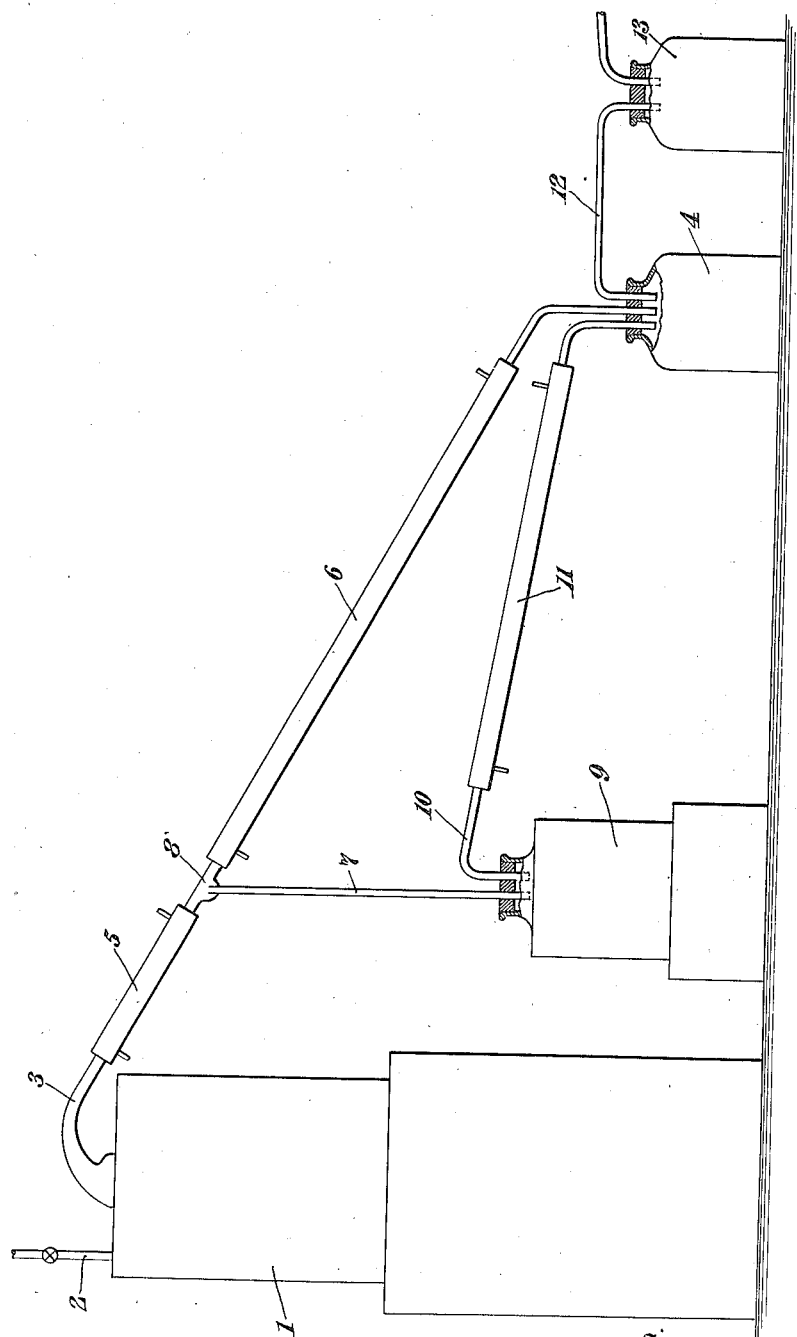
Inventor
John Fredriksson
By his Attorneys
Prindle, Wright & Small.

UNITED STATES PATENT OFFICE.

JOHN FREDRIKSSON, OF ELIZABETH, NEW JERSEY, ASSIGNOR TO THE KALBFLEISCH CORPORATION, OF NEW YORK, N. Y., A CORPORATION OF NEW YORK.

PROCESS FOR PRODUCING HIGHLY-CONCENTRATED HYDROCHLORIC ACID.

1,398,224. Specification of Letters Patent. Patented Nov. 29, 1921.

Application filed November 9, 1918. Serial No. 261,784.

*To all whom it may concern:*

Be it known that I, JOHN FREDRIKSSON, of Elizabeth, in the county of Union, and in the State of New Jersey, have invented a certain new and useful Improvement in Processes for Producing Highly-Concentrated Hydrochloric Acid, and do hereby declare that the following is a full, clear, and exact description thereof.

This invention relates to a process for purifying and concentrating hydrochloric acid, and pertains especially to a process for producing a hydrochloric acid of very high concentration, by a fractional condensation at certain predetermined temperatures of aqueous vapor mixed with hydrochloric acid gas.

In the hydrochloric acid industry, which is one of the oldest chemical industries, the acid is formed by the action of sulfuric acid on common, or rock salt. In the commercial application of this method an acid is produced of rarely over 23° Bé. contaminated with sulfuric acid, iron, alumina, and arsenic. In order to secure a chemically pure hydrochloric acid, it is necessary to carefully distil the above mentioned commercial acid, and to condense and absorb the distillate therefrom.

The serious defect in this process has always been that the chemically pure acid recovered is of lower strength than the commercial acid used, necessitating extra expense in order to secure a commercial acid of the high strength necessary to secure a chemically pure acid of the strength called for by the trade, and in some instances when an acid of exceptionally high strength is wanted it is not possible to produce such an acid by the ordinary method.

One object of my invention is to provide a process for producing highly concentrated hydrochloric acid in a simple and economical manner. Another object of my invention is to provide a suitable apparatus for carrying out the above mentioned process. A third object of my invention is to so modify the ordinary process of distilling hydrochloric acid as to separate out from the main distillation products such impurities as are carried along mechanically with the vapors, and which would otherwise contaminate the distillate.

In order to elucidate the nature of my new process, the principles underlying the same may be stated as follows:

The constant boiling strength of hydrochloric acid is approximately 13° Bé., and if an acid of higher strength than this is distilled the distillation products can be considered as consisting of a mixture of 13° Bé. acid and free hydrochloric acid gas. The ratio of free hydrochloric to 13° Bé. acid determines the strength of the final product and this ratio is, of course, always the same for a given strength of acid distilled.

If this ratio, $\dfrac{\text{Free HCl}}{13 \text{ Bé. acid}} = \text{constant}$)

in any way can be made larger, a stronger product will, of course, be the result. It will be seen from the equation that the constant can be made larger in two ways, viz:—
1. By increasing the amount of free hydrochloric acid gas; 2. By lowering the amount of 13° Bé. acid.

Heretofore, only the first case seems to have been considered, that is, when a chemically pure acid of high strength was wanted a stronger commercial acid was used.

This is an expensive procedure, and besides, the ratio $$\frac{\text{Free HCl}}{13 \text{ deg. Bé. acid}}$$

cannot be made very large.

I have now discovered a practical application of the second of the above alternatives which has decided advantages over the old process. According to the new process the distillation products obtained from an acid which may ordinarily be of a strength above 40° Bé. are cooled in a plurality of different stages, the first cooling stage being maintained at a temperature such that hydrochloric acid of a strength of about 13° Bé. will be condensed. The 13° Bé. condensate is drawn off into a reservoir which is provided with a heat insulating covering so as to prevent the dilute acid from becoming cold and absorbing undesirable quantities of hydrochloric acid gas. The uncondensed distillation products are then cooled to cause condensation of hydrochloric acid and absorption therein of most of the hydrochloric acid gas which is present. By a suitable regulation of the temperatures and the rate of distillation it has been found practicable to produce in this manner hydrochloric acid of a strength of 23.2° Bé. corresponding to a specific gravity of 1.19, whereas by the method now in common use it is only with great difficulty that an acid of 1.18 specific gravity can be produced. The increase in the specific gravity of .01 or more represents a substantial increase in the value of the product.

One embodiment of my invention is exemplified in the following description and illustrated in the accompanying drawing, which is a diagrammatic representation of the apparatus.

The apparatus comprises a still 1 with an inlet pipe 2 for introducing crude concentrated acid. A conduit 3 leads from the top of the still 1 to a receptacle 4, the latter being adapted to hold concentrated hydrochloric acid. A portion of the conduit 3 near the still 1 is provided with a cooler or condenser 5, while a subsequent portion of the conduit 3 is provided with another cooler or condenser 6; these coolers or condensers are applied to a substantial length of the conduit 3, the condenser 5 being preferably shorter than the condenser 6. A pipe 7 extends from an intermediate point 8 of the cooled part of the conduit to a receptacle 9, and another pipe 10 extends from the receptacle 9 to the receptacle 4, the pipe 10 being provided with a condenser 11. A pipe 12 leads from the receptacle 4 to a vessel 13 which constitutes the first of a series of absorption vessels.

The mode of operation is as follows: Commercial hydrochloric acid of a strength above 13° Bé., and ordinarily from 20 to 23° Bé., may be run continuously into still 1 which is fired preferably with coal. The distillation products pass first through condenser 5 where some 13° Bé. acid is condensed and runs by gravity to receptacle 9; the balance of the distillation products, which now consist of some 13° Bé. acid mixed with free HCl gas, pass on through condenser 6 where the 13° Bé. acid is condensed and cooled to such an extent that it absorbs the accompanying free HCl gas. The product is a strong hydrochloric acid that runs by gravity to receptacle 4. Practically all the impurities which were carried over mechanically by the distillation vapors will be carried by the condensate from condenser 5 through the pipe 7 to receptacle 9, thus leaving the remaining distillation products quite pure. A certain amount of vapor and HCl gas will accompany the liquid which is drawn off through pipe 7; this gas and vapor, as well as any additional gas and vapor which is given off by the liquid in receptacle 9 is conveyed by pipe 10 to receptacle 4 where it is absorbed by the cold acid therein, thus further concentrating this acid.

Any HCl gas which is not absorbed passes to an absorption battery where a complete absorption of the HCl is effected. The receptacle 9 is preferably insulated so as to keep the acid therein sufficiently hot to prevent the absorption of undesirable quantities of HCl gas. It is ordinarily intended that the liquid which is condensed in the condenser 5 shall be of 13° Bé. strength, but this liquid invariably absorbs at least a small amount of HCl gas, so that the condensate in receptacle 9 will usually be a little above 13° Bé., but less than 20° Bé.; and in practice it frequently reaches 15 or 16° Bé. By the expression "about 13° Bé.", I mean to include an acid of 13° to 15° Bé. or a little higher. This acid will ordinarily have a hydrocloric content above 19% but below 23%.

The vapors of a 13° Bé. acid condense at a temperature of about 230° F., so that the temperature of the condenser 5 should be somewhat below 230° F. and may well be between 200° and 215° F. The exact temperature of the condenser 5 will depend upon the strength of the crude acid which is distilled; when the crude acid has a strength of 20° Bé. (that is, 31.4% HCl) the temperature of condenser 5 is around 200° F., whereas when the crude acid is of 23° Bé. (that is, 37.1% HCl) the temperature of condenser 5 is maintained at about 212° F. It will be understood, of course, that these temperatures are only approximate, since they may have a higher or lower value, depending upon the length of the condenser.

Although according to the preferred embodiment of my invention the vapors which are subjected to fractional condensation are obtained by the distillation of a crude concentrated hydrochloric acid, my invention is not limited to the treatment of vapors produced in this way but is applicable to a mixture of aqueous vapor and HCl gas produced in any way and which preferably has an HCl content of from about 27 to 37%.

The dilute acid which collects in receptacle 9, and which has a strength ordinarily of from about 13 to 15° Bé., may be used advantageously for absorbing crude HCl gas in the ordinary process of manufacturing hydrochloric acid, this dilute acid being introduced into one of a series of Wolff bottles of an ordinary absorption system in which the acid has obtained a strength which is practically the same as that of the acid which collects in receptacle 9. By operating in this manner, the dilute acid from receptacle 9 is built up to a high concentration before being again introduced into still 1.

Although I have described one embodiment of my invention in considerable detail, it will be understood that numerous changes can be made in both the process and the apparatus without departing from the scope of my invention.

I claim:

1. The process of producing highly concentrated hydrochloric acid which comprises distilling hydrochloric acid of a strength above 14° Bé., cooling the resulting vapors to form a hydrochloric acid condensate whose HCl content is less than the HCl content of the vapor mixture, and then subjecting the remaining vapor mixture to further cooling to produce a concentrated hydrochloric acid.

2. The process of producing highly concentrated hydrochloric acid which comprises distilling hydrochloric acid of a strength above 14° Bé., cooling the resulting vapors to a temperature low enough to condense 13° Bé. acid but sufficiently high to prevent undesirable absorption of hydrochloric acid gas by said 13° Bé. acid, and then subjecting the remaining vapor mixture to further cooling to produce a concentrated hydrochloric acid.

3. The process of producing highly concentrated hydrochloric acid which comprises distilling hydrochloric acid of a strength of from about 20 to 23° Bé., passing the resulting vapors through a condenser maintained at a temperature of from about 200 to 215° F. to form a condensate of a strength of substantially less than 20° Bé., separating the condensate from the remaining vapor mixture, and then cooling the latter to form a highly concentrated acid.

4. In the process of producing concentrated hydrochloric acid, the steps which comprise cooling a hydrochloric acid vapor mixture, having an HCl content substantially greater than that possessed by a 13° Bé. acid, to form a less concentrated condensate having a strength of from about 13 to 16° Bé., separating said condensate from the remaining vapor mixture, and then cooling the latter to form a highly concentrated hydrochloric acid.

5. In the process of producing concentrated hydrochloric acid, the steps which comprise cooling a hydrochloric acid vapor mixture, having an HCl content of from about 27 to 37%, to form a condensate containing from about 19 to 23% HCl, separating said condensate from the remaining vapor mixture, and then cooling the latter to form a highly concentrated hydrochloric acid.

6. In the process of producing concentrated hydrochloric acid by distilling hydrochloric acid of a strength above 14° Bé., the steps which comprise preliminarily removing from the distillation vapors weaker hydrochloric acid of a strength between about 13° Bé. and the strength of the acid which was distilled, and then condensing the remaining vapors to form an acid of greater strength than said removed acid.

7. The process of producing highly concentrated hydrochloric acid which comprises distilling hydrochloric acid of a strength above 14° Bé., preliminarily cooling the distillation products to condense out weaker hydrochloric acid of a strength of about 13° Bé., separating from the main distillation products said condensed acid while maintaining its temperature at such a point that it will absorb only a small amount of hydrochloric acid gas, and returning hydrochloric acid gas and vapor, which accompanies said separated acid, to the main distillation products.

8. The process of producing highly concentrated hydrochloric acid which comprises distilling hydrochloric acid of a strength above 14° Bé., preliminarily cooling the distillation products to condense out weaker hydrochloric acid of a strength of about 13° Bé., separating from the main distillation products said condensed acid, cooling the main distillation products to form a distillate of strong hydrochloric acid, cooling the hydrochloric acid gas and vapor which accompanies the preliminarily condensed acid, and bringing the products resulting from said last mentioned cooling into contact with said distillate.

In testimony that I claim the foregoing I have hereunto set my hand.

JOHN FREDRIKSSON.

Witnesses:
 CHAS. M. HEPP,
 THOS H. GOFF.